United States Patent
Distler et al.

(10) Patent No.: US 7,570,652 B1
(45) Date of Patent: Aug. 4, 2009

(54) SYSTEMS AND METHODS FOR HANDLING FRAME DISCARD INDICATION WITHIN CELL-BASED DATA COMMUNICATION NETWORKS

(75) Inventors: Rudi A. Distler, Holmdel, NJ (US); Zan Pan, Aberdeen, NJ (US); Mostafa Hashem Sherif, Tinton Falls, NJ (US)

(73) Assignee: AT&T Corp., New York, NY (US)

( * ) Notice: Subject to any disclaimer, the term of this patent is extended or adjusted under 35 U.S.C. 154(b) by 1070 days.

(21) Appl. No.: 10/233,724

(22) Filed: Sep. 3, 2002

(51) Int. Cl.
*H04L 12/28* (2006.01)

(52) U.S. Cl. ............... 370/412; 370/239; 370/240; 370/473; 370/310.1; 370/395.6

(58) Field of Classification Search ............ 370/412, 370/310.1, 395.6, 395.61, 395.64, 905, 237, 370/229, 239–240, 473
See application file for complete search history.

(56) References Cited

U.S. PATENT DOCUMENTS

| | | | |
|---|---|---|---|
| 5,822,540 A * | 10/1998 | Caldara et al. ............ 709/236 |
| 6,282,171 B1 * | 8/2001 | Adams et al. ............ 370/229 |
| 6,370,112 B1 * | 4/2002 | Voelker ............ 370/218 |
| 6,487,198 B1 * | 11/2002 | Pierson, Jr. ............ 370/356 |
| 6,633,569 B2 * | 10/2003 | Hemmady ............ 370/398 |

* cited by examiner

*Primary Examiner*—Huy D. Vu
*Assistant Examiner*—Kibrom T Hailu

(57) ABSTRACT

A data communication network provides techniques for handling frame discard of non-delineable flows. When a data flow is established, it is evaluated to determine whether a frame delimiter value is required and, if so, whether it is present. If the frame delimiter is required and missing, then the flow is declared non-delineable. If, subsequently, a congestion threshold is reached for this data flow, cells are discarded until a) a frame delimiter value is received, b) congestion drops below the threshold or c) a predetermined number of cells are discarded. These techniques provide frame discard handling mechanisms that alleviate the need for NOC personnel to intervene in problems caused by non-delineable frame discard flows.

24 Claims, 4 Drawing Sheets

| Signalled frame discard indicator | AAL type in the SETUP message as defined in Q.2931 | | | | | |
|---|---|---|---|---|---|---|
| | Other cases (1) | AAL 0 | AAL 1 | AAL 2 | AAL 3/4 | AAL 5 |
| Frame discard indicator set to 1 (Frame discard allowed) | Frame discard allowed (2) | | | | | Frame discard allowed |
| Frame discard indicator set to 0 (No frame discard allowed) | No frame discard allowed | | | | | Frame discard allowed |
| Frame discard indicator unspecified | No frame discard allowed | | | | | Frame discard allowed |

Notes:
(1) This situation covers the following cases:
- The ATM adaptation layer parameters information element is not present, for example, in the case of Soft PVCs
- The ATM adaptation layer parameters information element is coded as user specific
- The ATM adaptation layer parameters information element has an unrecognized content
- Multiple instances of the ATM adaptation layer parameters information element are present in the SETUP message (AAL negotiation as per Annex F of Q.2931).

(2) This combination requires that a frame is delimited by the ATM user-to-user indication in the PT (Payload Type) field of the ATM header in accordance with the ATM Forum Traffic Management Specification, Version 4.1

Figure 2

SYSTEMS AND METHODS FOR HANDLING FRAME DISCARD INDICATION WITHIN CELL-BASED DATA COMMUNICATION NETWORKS

BACKGROUND

The present invention relates generally to communication systems and methods and, more particularly, to systems and methods for handling frame discard indication within cell-based data communication networks, i.e., indications at the interface of data communication networks with cell-based networks, such as asynchronous transfer mode (ATM) networks.

ATM technology has played a central role in the evolution of workgroup and enterprise networks. It has the capability to provide scalable bandwidth at commercially attractive price and performance guarantees, which have facilitated new classes of data applications, such as multimedia.

ATM networks are formed from ATM switches interconnected by ATM links or interfaces, an example of which is shown in FIG. 1. Therein, an ATM network 10 includes two ATM switches 12 and 14. ATM switch 12 supports data communication with two end user (edge) devices 16 and 18, e.g., computers, while ATM switch 14 provides data communication between the network 10 and router 20. Those skilled in the art will appreciate that many ATM networks will contain substantially more ATM switches and user devices than those shown in FIG. 1 and that such ATM networks will themselves be connected to other ATM networks, e.g., network 22 in FIG. 1. Typically there will also be a network management system (not shown in FIG. 1) that is connected to all of the system nodes for monitoring purposes.

Signaling between the nodes in ATM network 10 is performed as described in various standardized interface specifications. ATM networks employ two different types of interfaces: user-network interfaces (UNI) and network-network interfaces (NNI) to support this signaling. Generally speaking, UNI interfaces are used for communication between an ATM switch and an end user device or system (a personal computer, a router, a host, etc.), while NNI interfaces are used for communication between ATM switches. Of particular interest for understanding the present invention are the UNI signaling specifications, which are described in the document entitled "ATM User-Network Interface (UNI) Signaling Specification", Version 4.1, April 2002, promulgated by the ATM Forum Technical Committee. This document (hereafter referred to as "UNI 4.1") is available, for example, from the ATM Worldwide Headquarters, Presidio of San Francisco, 572B Ruger Street, San Francisco, Calif. 94129 and the contents thereof are expressly incorporated herein by reference.

Even more specifically, the present invention is related to the UNI signaling associated with frame discard. Table A13.1 of UNI 4.1 (reproduced herein as FIG. 2) describes how an ATM node interprets a received frame discard indicator based on the signaled ATM Adaptation Layer (AAL) type, which provides the interface between the user layer and the ATM layer for applications with similar requirements. Different AAL types are defined to support different types of traffic. Those skilled in the art will appreciate that the various types of AAL (e.g., AAL 0, AAL 1, AAL 2, AAL 3/4 and AAL 5) are employed to enable variably sized data packets to be processed and transported via fixed sized ATM cells. AAL5 includes an "end of message" to indicate to the ATM layer that all the cells that correspond to a user frame have been processed. Thus, for AAL5, the ATM layer is aware of the boundaries of the user data frame. In the event of congestion, if frame discard allowed has been signaled by the user, the ATM layer can intelligently discard all the cells that correspond to the entire data frame, rather than less efficiently discarding cell by cell. Note that for all AAL types other than AAL 5, when frame discard is allowed the ATM layer is not aware of the frame boundaries. Thus, it may end up randomly discarding cells from different frames. According to Table A13.1 of UNI 4.1, this is the condition that occurs when the signaled frame discard indicator is set to 1 and the AAL type is different from AAL5. Flows which lack the frame delimiter required to indicate frame boundaries are referred to herein as "non-delineable flows".

Discarding cells without knowing the frame boundaries can cause problems in ATM networks. For example, a user can initiate an ATM connection using AAL 5 with the frame discard feature allowed and later switch to another AAL type without adding the required frame delimiter to the appropriate ATM cell header. When congested cells are discarded at random (because there is no concept of end of frame in the other AAL types), the cells may belong to different frames, resulting in the loss of data from several frames. The user application may then initiate retransmission of the lost data, thereby exacerbating the congestion condition in the network element. Furthermore, any network interface specifications that do not provide mechanisms for handling non-delineable flows (such as UNI 4.0, UNI 4.1 or any other specifications) may cause the throughput for non-delineable flows to drop significantly if the buffer management mechanism of the network element does not take that condition into account. Identifying and correcting this problem after it occurs poses significant challenges for a network operator given the complexity of ATM systems Accordingly, it would be desirable to provide systems and methods for handling non-delineable flows associated with frame discard in ATM systems.

SUMMARY

Systems and methods according to the present invention address this need and others by observing traffic flow to determine whether a non-delineable flow condition exists. If a frame delimiter is not identified as a result of this observation, a flag is set which identifies the flow as non-delineable and the network management system can be notified of this condition. Then, if subsequent congestion results in a congestion threshold being crossed, a block of cells in the non-delineable flow is discarded. Discard of cells is continued until either a) a frame delimiter is received in the flow, b) the buffer falls below the congestion threshold, or c) a predetermined number of cells are discarded.

In accordance with the invention as described herein, a method of frame discard handling comprises receiving a signal indicating that frame discard is permitted for a flow of data cells, receiving and buffering data cells in the flow, evaluating a predetermined field within each of the data cells in the flow to determine whether a frame delimiter value has been received, and if the frame delimiter value has not been received, then discarding a second plurality of data cells when a predetermined congestion threshold is reached.

BRIEF DESCRIPTION OF THE DRAWINGS

The accompanying drawings illustrate exemplary embodiments of the present invention, wherein:

FIG. 2 is a table from UNI 4.1 illustrating handling of frame discard indication signaling in ATM systems;

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims.

Systems and methods according to exemplary embodiments of the present invention provide mechanisms for handling non-delineable flows in data communication systems. Although ATM systems are used for the purpose of illustration in this detailed description, those skilled in the art will appreciate that the techniques described herein are equally applicable to other data communication systems that employ frame discard techniques to alleviate congestion but whose packet headers do not always contain frame delimiting information. In order to better understand exemplary implementation of techniques according to the present invention, a brief description of an exemplary ATM connection is first described below.

Figure 1:
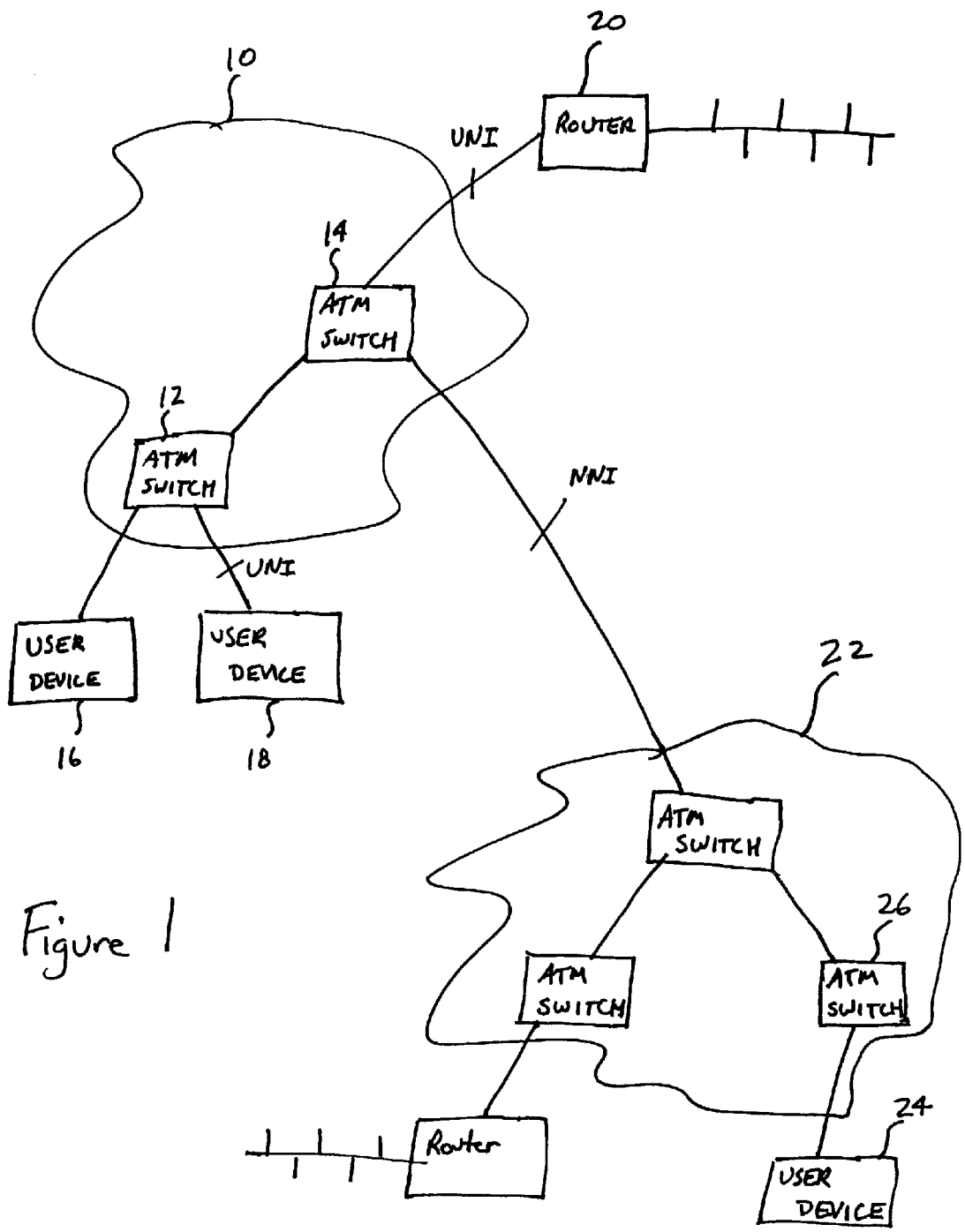
FIG. 1 depicts an ATM network in which exemplary embodiments of the present invention can be implemented.

Returning to FIG. 1, consider that an ATM connection is to be set up between user device 18 and user device 24. Those skilled in the art will appreciate that there are many different types of ATM connections that can be established between two users. For example, permanent virtual circuits (or paths) are connections that are statically configured via the network management system, e.g., by setting up VPI/VCI tables in the user devices and switches to indicate the addresses that identify the endpoints of the connection. Alternatively, switched virtual circuits (or paths) are connections that are dynamically established via signaling. For the purpose of the present invention all of these ATM connections, and other data network connections, are generically referred to herein by the term "virtual connection". The establishment of a virtual connection between user devices 18 and 24 begins with the sending of a connection message from user device 18 to user device 24 as shown in the signaling diagram of FIG. 3. To simplify this figure, all of the ATM switches between user device 18 and user device 24 have been consolidated into a single node.

ATM signaling uses a one-pass method of connection setup wherein a connection request is propagated through the network, setting up the connection as it goes, until it reaches its destination. The routing of the connection request (the SETUP message in FIG. 3), and the subsequent data flow, is governed by the ATM routing protocols. Such protocols route the SETUP message based upon the destination address and the traffic and quality of service (QoS) parameters requested by the user. The destination user may choose to accept or reject the connection request. A number of message types are defined in above- incorporated by reference UNI 4.1 specification, together with a number of state machines defining the operation of the protocol, error codes defining reasons for connection failure, etc. Data elements used in the signaling protocol, e.g., addresses, are carried within Information Elements (IE) within the signaling packets.

Figure 3:
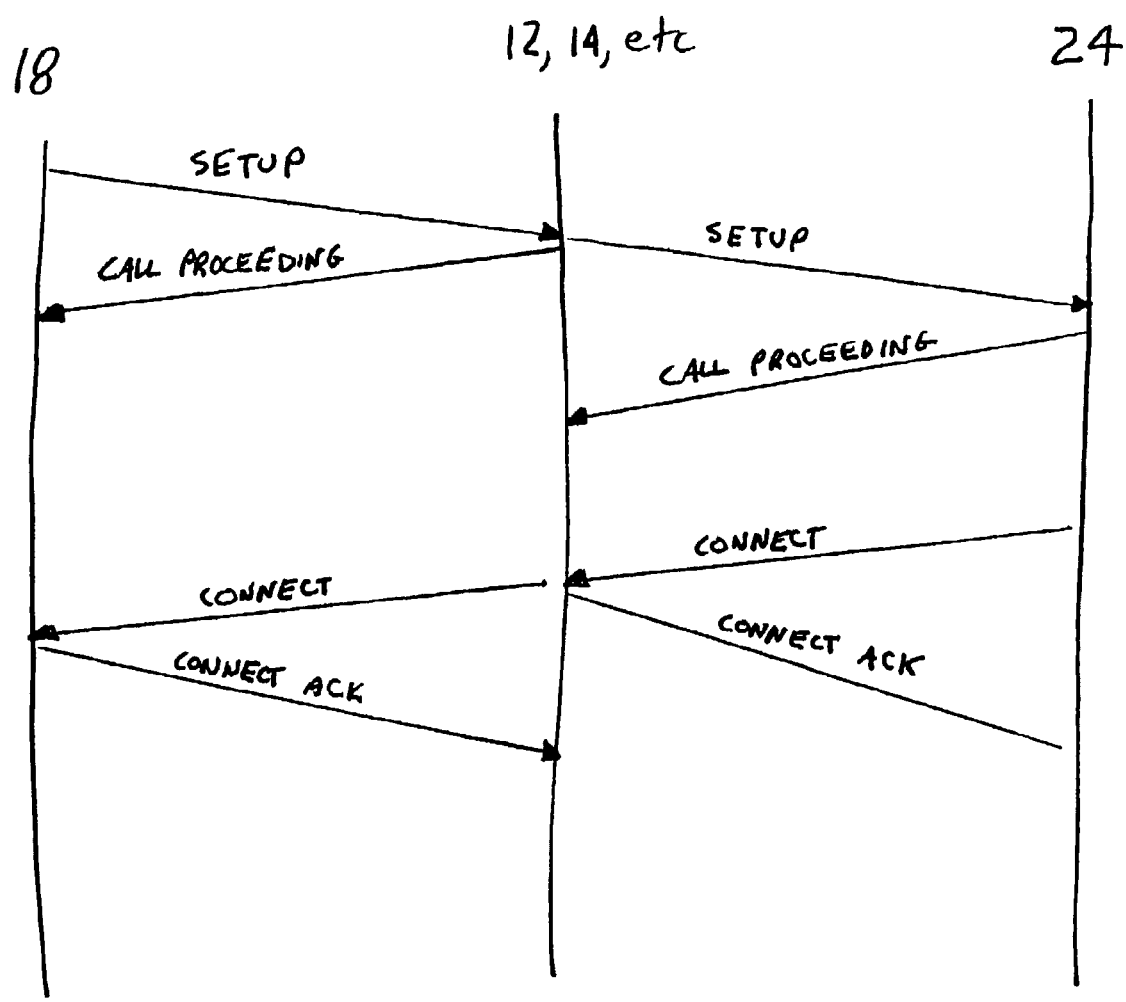
FIG. 3 illustrates exemplary signaling associated with connection establishment.

With respect to the example of FIG. 3, user device 18 generates and sends into the network, across its UNI, a SETUP message, containing the address for user device 24, desired traffic and QoS parameters and various IEs indicating, among other things, the AAL type to be used and that frame discard is allowed. This SETUP message is received in the network, sent to and received by ATM switch 12, across the UNI, which responds with a CALL PROCEEDING acknowledgment. Switch 12 will then invoke an ATM routing protocol to propagate the signaling request across the network to switch 26.

Switch 26 will then forward the SETUP message to the user device 24 across its UNI, which will result in the user device 24 generating a CALL PROCEEDING acknowledgement back through the network. User device 24 may choose to either accept or reject the connection request; in the illustrated case, it returns a CONNECT message, received by and sent back through the network, along the same path, to the user device 18. Like the SETUP message, the CONNECT message received by the network will also typically include a number of IEs, including for this example an indication that backward frame discard is allowed. Once the user device 18 receives and acknowledges the CONNECT message, either node can then start transmitting data on the connection.

An important challenge associated with ATM networks is congestion. Congestion occurs, for example, when two data cells are directed to the same output (e.g., switch port) at the same time. When this occurs, one of the two cells will be stored in a buffer for subsequent output. Alternatively, congestion can occur when the number of cells to be stored in a memory resource in the network (e.g., a routing table or buffer) exceeds the physical capacity of that resource. When network buffers become too full, or are in danger of becoming too full, the network management system makes decisions regarding the discarding of data cells. These decisions are typically made when the memory resource at issue exceeds a certain capacity threshold. Those skilled in the art will appreciate that many different types of thresholds can be used in data communication systems to monitor congestion, e.g., early packet discard thresholds, partial packet discard thresholds, customized thresholds communicated between users, etc., all of which are intended to be encompassed by the term "threshold" herein. An example of congestion handling in ATM switches can be found in U.S. Pat. Nos. 6,128,278 and 6,134,218, the disclosures of which are incorporated herein by reference. These documents also describe in more detail the structure of ATM switches, including input and output ports, processors and buffers used therein.

For connections wherein frame discard is allowed, as is the case in the exemplary connection of FIG. 3, when a congestion threshold is exceeded, the network node at issue will attempt to discard complete frames of user cells rather than discarding cells at random, which may correspond to many frames. As long as the assumptions set forth in FIG. 2 are met, i.e., either AAL 5 is used or another AAL type is used and frame delimiters are transmitted, this will pose no problem. The frame delimiters can, for example, consist of setting the Payload Type field (bits 4-2 of octet 4) of the ATM header to either "001 " or "011". If, however, after the connection is established, the user 18 transmits a different AAL type other than AAL 5 and fails to include the frame delimiter in the appropriate cell(s), then the network management system will be unable to discern complete frames and unable to perform frame discard properly when the congestion threshold(s) are exceeded.

Figure 4:
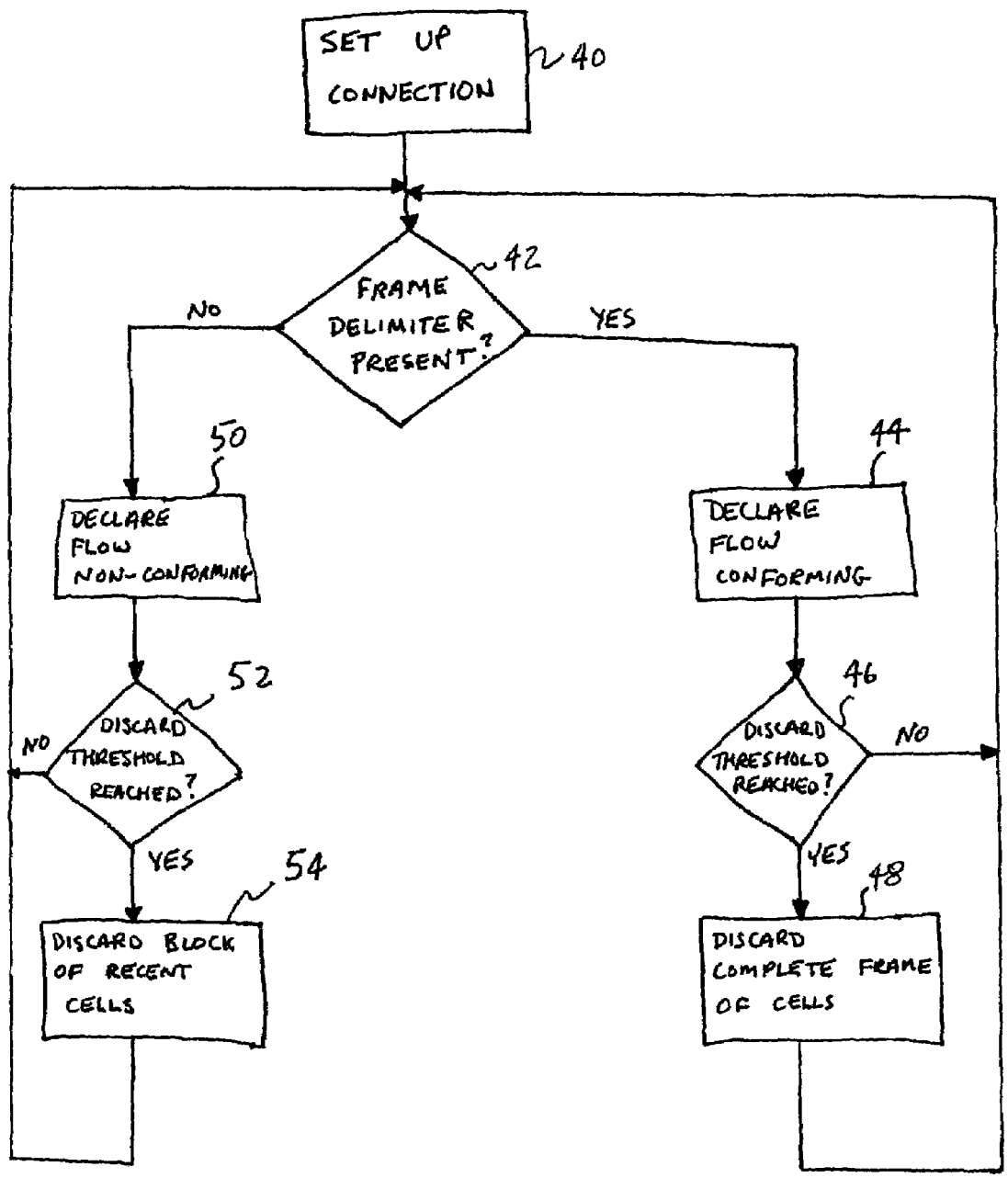
FIG. 4 is a flowchart that illustrates an exemplary frame discard process according to the present invention.

Accordingly, in FIG. 4, Applicants set forth an exemplary technique according to the present invention by way of which frame discard can be handled when a non-delineable flow is identified. After a connection is established which includes an indication that frame discard is allowed (step 40), e.g., as described above, the data cells in the traffic flow are observed at step 42 to determine whether a frame delimiter is present. This observation can be performed by one or more network elements. The observation period can, for example, take place periodically in the case of permanent virtual connections or when established for switched virtual connections. According to exemplary embodiments of the present invention, the search for a frame delimiter occurs over a predetermined window of cells, e.g., 1024 cells, 2048 cells or any other number of cells. In the ATM examples provided above, this entails evaluating the payload type field in each cell in the window to determine if a value of "001" or "011" is present. Those skilled in the art will appreciate, however, that frame delimiters according to the present invention can be provided in many different forms and are not limited to these exemplary values or to placement within ATM cell headers.

If a frame delimiter is found within the predetermined window at step 42, then the flow follows the "YES" branch in the flow chart of FIG. 4 and the flow is identified as a delineable flow at step 44, since the network can identify frames for discard. Thus, if a discard (congestion) threshold is reached at step 46, the system is then able to discard a complete frame at step 48 in order to relieve congestion.

If, on the other hand, a frame delimiter is not found within the predetermined window at step 42, then the flow follows the "NO" branch in the flow chart of FIG. 4 and the flow is identified as a non-delineable flow at step 50. The node that identifies the flow as non-delineable can then send a signal to the network management system indicating this flow status, e.g., by way of a trap associated with this condition. Then, when the discard (congestion) threshold is reached at step 52, techniques according to the present invention will begin to discard cells from the congested memory resource at step 54. As with step 50, when step 54 is reached in the frame discard handling process, another trap can be sent to the network management system in order to alert the system that cells are being discarded. Cell discard will continue along the "NO" branch of the flow from step 42 until either (a) a frame delimiter is identified in the traffic flow, (b) congestion drops below the discard threshold or (c) a predetermined number of cells (e.g., 1024 or 2048) have been discarded. Note that in the event of a temporarily idle connection where no AAL5 data flow is present, but possibly heavy flows of non-AAL5 OAM cells (PTI=100 or 101) or RM cells (PTI=110) are present, the technique described can alleviate congestion and gracefully handle the resumption of data flow.

Applicants anticipate that employing frame discard techniques such as those described above will have many beneficial consequences in ATM (and other) data communication networks. In addition to improving the overall reliability of such networks by handling non-delineable data flows, these techniques will allow the network operating center (NOC) to detect the presence of non-delineable flows so that potential faults can be diagnosed and resolved.

The above-described exemplary embodiments are intended to be illustrative in all respects, rather than restrictive, of the present invention. Thus the present invention is capable of many variations in detailed implementation that can be derived from the description contained herein by a person skilled in the art. For example, although exemplary embodiments of the present invention have been described in conjunction with the UNI 4.1 signaling specification, those skilled in the art will appreciate that earlier versions (e.g., UNI 4.0), later versions, or all together different standards can be used in conjunction with the present invention. All such variations and modifications are considered to be within the scope and spirit of the present invention as defined by the following claims. For example, the Frame handling procedures described can be also employed on the input policer in the event of frame aware policing capabilities such as partial packet policing. No element, act, or instruction used in the description of the present application should be construed as critical or essential to the invention unless explicitly described as such. Also, as used herein, the article "a" is intended to include one or more items.

What is claimed is:

1. A method for managing congestion in a data network by discarding data cells in a flow of data cells from a user, comprising the steps of:
   receiving a message indicating that frame discard is permitted for the flow of data cells;
   receiving and buffering a window comprising a first predetermined plural number of data cells in said flow;
   evaluating a predetermined field within each of said first predetermined plural number of data cells in said flow to determine whether a frame delimiter value has been received at any point in the window of data cells; and
   if it is determined by evaluating said predetermined cell fields that said frame delimiter value has not been received at any point within the first predetermined plural number of data cells in said flow, then
   discarding a second predetermined plural number of data cells when a predetermined congestion threshold is subsequently reached.

2. The method of claim 1, further comprising the steps of:
   receiving a message that a first ATM adaptation layer (AAL) is to be used for said flow of data cells;
   subsequently receiving a message that a second AAL is to be used for said flow of data cells; and
   said step of evaluating is performed when the message that a second AAL is to be used is received.

3. The method of claim 1, wherein said first and second predetermined number of data cells is 2048 cells.

4. The method of claim 1, wherein said flow of data cells is associated with a permanent virtual connection and said step of evaluating is performed periodically.

5. The method of claim 1, wherein said flow of data cells is associated with a switched virtual connection and said step of evaluating is performed when said switched virtual connection is established.

6. The method of claim 1, wherein said data cells are asynchronous transfer mode (ATM) cells.

7. The method of claim 6, wherein said predetermined field is a payload type (PT) field that includes bits 4-2 of octet 4 in a header in each of said first plurality of ATM cells.

8. The method of claim 1, further comprising the step of:
   if it is determined by evaluating said predetermined cell fields that said frame delimiter value has been received, then discarding a frame of data cells when said predetermined congestion threshold is reached.

9. A communication node arranged to manage congestion by discarding data cells in a flow of data cells from a user comprising:
   means for receiving a message indicating that frame discard is permitted for the flow of data cells;
   means for receiving and buffering a window comprising a first predetermined plural number of data cells in said flow;
   means for evaluating a predetermined field within each of said first predetermined plural number of data cells in said flow to determine whether a frame delimiter value has been received at any point in the window of data cells; and means for discarding a second predetermined number of data cells when a predetermined congestion threshold is subsequently reached if the evaluating means has determined that said frame delimiter value has not been received at any point within the window comprising the first predetermined plural number of data cells in said flow.

10. The communication node of claim 9, further comprising:
means for receiving a message that a first ATM adaptation layer (AAL) is to be used for said flow of data cells and for subsequently receiving a message that a second AAL is to be used for said flow of data cells; and
the means for evaluating evaluates said predetermined field within said predetermined number of data cells when the message that said second AAL is to be used is received.

11. The communication node of claim 9, wherein said first and second predetermined number of data cells is 2048 cells.

12. The communication node of claim 9, wherein said flow of data cells is associated with a permanent virtual connection and said means for evaluating evaluates said first predetermined number of data cells periodically.

13. The communication node of claim 9, wherein said flow of data cells is associated with a switched virtual connection and said means for evaluating evaluates said first predetermined number of data cells when said switched virtual connection is established.

14. The communication node of claim 9, wherein said data cells are asynchronous transfer mode (ATM) cells.

15. The communication node of claim 14, wherein said predetermined field is a payload type (PT) field that includes bits 4-2 of octet 4 in a header in each of said first plurality of ATM cells.

16. The communication node of claim 1, further comprising:
means for discarding a frame of data cells when said predetermined congestion threshold is reached if said evaluating means has determined that said frame delimiter value has been received.

17. A communication switch arranged to manage congestion by discarding data cells in a flow of data cells from a user comprising:
an input for receiving a message indicating that frame discard is permitted for the flow of data cells;
a buffer for receiving and storing a first window comprising a predetermined plural number of data cells in said flow; and
a processor for evaluating a predetermined field within each of said first predetermined plural number of data cells in said flow to determine whether a frame delimiter value has been received at any point in the window of cells and for discarding a second predetermined number of data cells when a predetermined congestion threshold is subsequently reached if said evaluation has determined that said frame delimiter value has not been received at any point within said first predetermined plural number of data cells in said flow.

18. The communication switch of claim 17, wherein said switch first receives a message that a first ATM adaptation layer (AAL) is to be used for said flow of data cells, then receives a message indicating that a second AAL is to be used for said flow of data cells and wherein evaluating said predetermined field of said first predetermined number of data cells takes place when the message indicating that a second AAL is to be used in received.

19. The communication switch of claim 17, wherein said first and second predetermined number of data cells is 2048 cells.

20. The communication switch of claim 17, wherein said flow of data cells is associated with a permanent virtual connection and said processor evaluates said first predetermined number of data cells periodically.

21. The communication switch of claim 17, wherein said flow of data cells is associated with a switched virtual connection and said processor evaluates said first predetermined number of data cells when said switched virtual connection is established.

22. The communication switch of claim 17, wherein said data cells are asynchronous transfer mode (ATM) cells.

23. The communication switch of claim 22, wherein said predetermined field is a payload type (PT) field that includes bits 4-2 of octet 4 in a header in each of said first plurality of ATM cells.

24. The communication switch of claim 17, wherein said processor further performs the function of discarding a frame of data cells when said predetermined congestion threshold is reached if said evaluation has determined that said frame delimiter value has been received.

* * * * *